(12) United States Patent
Kaneda et al.

(10) Patent No.: US 8,472,799 B2
(45) Date of Patent: Jun. 25, 2013

(54) IMAGING DEVICE

(75) Inventors: Norikazu Kaneda, Osaka (JP); Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/284,982

(22) Filed: Oct. 31, 2011

(65) Prior Publication Data

US 2012/0106940 A1 May 3, 2012

(30) Foreign Application Priority Data

Nov. 2, 2010 (JP) ................................. 2010-246383

(51) Int. Cl.
*G03B 15/03* (2006.01)
(52) U.S. Cl.
USPC ....................................................... 396/177
(58) Field of Classification Search
USPC ................................................. 396/176–178
See application file for complete search history.

(56) References Cited

U.S. PATENT DOCUMENTS

| 2004/0071459 | A1 | 4/2004 | Ujikane et al. |
| 2011/0052171 | A1* | 3/2011 | Yasuda et al. ................. 396/176 |
| 2012/0106940 | A1* | 5/2012 | Kaneda et al. ................ 396/177 |
| 2012/0148226 | A1* | 6/2012 | Nishiwaki .................... 396/177 |

FOREIGN PATENT DOCUMENTS

| JP | 4434656 B | 1/2010 |
| JP | 2010-191017 A | 9/2010 |

* cited by examiner

*Primary Examiner* — William B Perkey
(74) *Attorney, Agent, or Firm* — Shinjyu Global IP

(57) ABSTRACT

An imaging device includes an optical system, a camera housing defining an opening with an interior storage space, and a flash mechanism connected to the housing. The flash mechanism is movable between an exposed state and an unexposed state. The flash mechanism has a first arm, a second arm, and a light emitting component attached to the second arm. The first arm is located at a first rotational position in the exposed state and is configured to rotate around a first axis located within the interior space. The second arm is located at a third rotational position in the exposed state and is configured to rotate with respect to the first arm around a second axis located closer to the subject than the first axis in the exposed state.

6 Claims, 12 Drawing Sheets

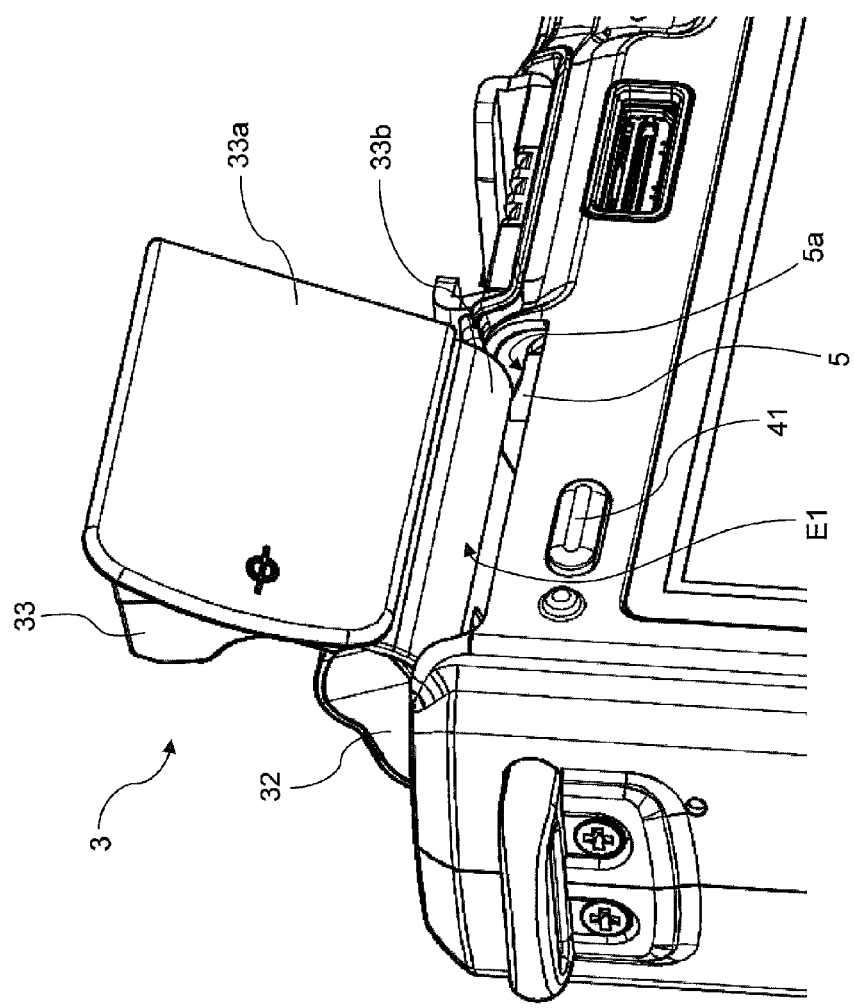

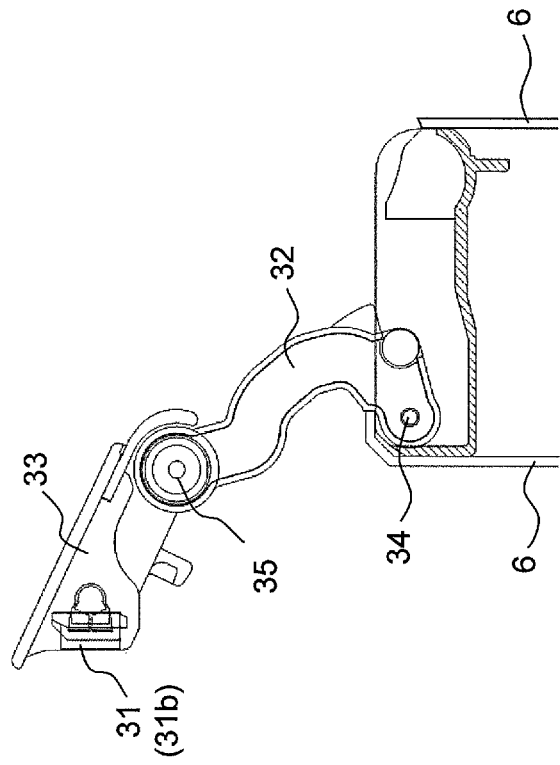
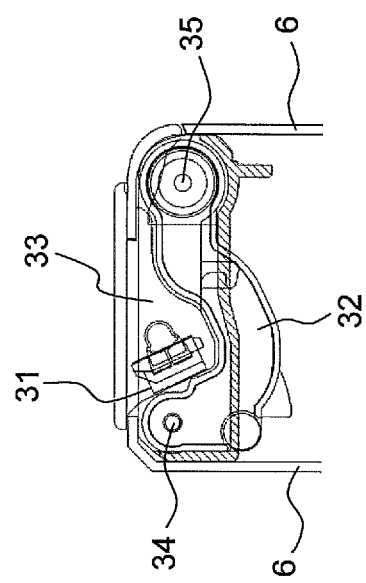
FIG. 10B
FIG. 10A

IMAGING DEVICE

CROSS-REFERENCE TO RELATED APPLICATIONS

This application claims priority under 35 U.S.C. §119 to Japanese Patent Application No. 2010-246383, filed on Nov. 2, 2010 and Japanese Patent Application No. 2011-229799 filed on Oct. 19, 2011. The entire disclosure of Japanese Patent Application No. 2010-246383 and Japanese Patent Application No. 2011-229799 are hereby incorporated herein by reference.

BACKGROUND

1. Technical Field

The technology disclosed herein relates to an imaging device having a flash mechanism.

2. Background Information

Imaging devices having a flash mechanism that can be stowed in a camera housing have been known up to now (see, for example, Japanese Patent No. 4,434,656). This imaging device has a first arm that rotates around a first rotating central axis located within a storage space, a second arm that is supported by the first arm and rotates around a second rotating central axis, and a light emitting component that is supported by the second arm and emits flash light.

SUMMARY

It has been discovered with the imaging device of Japanese Patent No. 4,434,656, that in an exposed state in which the light emitting component has popped up from its storage space, there is the risk that the range over which the flash light is emitted from the light emitting component will be limited. More specifically, it has been discovered that the flash light emitted from the light emitting component may be blocked by a lens unit attached to the front face of the housing. To solve the aforementioned problem, an imaging device is provided in which blockage of flash light emitted from a light emitting component by a lens unit can be reduced.

In particular, an imaging device is provided that includes an optical system, a camera housing, and a flash mechanism. The optical system has an optical axis and is configured to form an optical image of a subject. The camera housing defines an opening with an interior storage space. The flash mechanism is connected to the camera housing and is movable between an exposed state and an unexposed state. In the exposed state, the flash mechanism extends outwardly from the interior space, and in the unexposed state, the flash mechanism is positioned within the interior space. The flash mechanism has a first arm, a second arm, and a light emitting component attached to the second arm. The first arm is located at a first rotational position in the exposed state and is configured to rotate around a first axis located within the interior space. In the unexposed state, the first arm is located at a second rotational position with the second rotational position being more than 90° away from the first rotational position. The second arm is located at a third rotational position in the exposed state and is configured to rotate with respect to the first arm around a second axis located closer to the subject than the first axis in the exposed state. In the unexposed state, the second arm is located at a fourth rotational position with the fourth rotational position being different from the third rotational position.

With the technology disclosed herein, an imaging device can be provided in which blockage of flash light emitted from a light emitting component by a lens unit can be reduced.

These and other features, aspects and advantages of the technology disclosed herein will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure:

FIG. 9 is a rear oblique view of a flash mechanism during movement from the exposed state to the unexposed state;

FIG. 10A is a side see-through view illustrating the operation of a flash mechanism;

FIG. 10B is a side see-through view illustrating the operation of a flash mechanism;

DETAILED DESCRIPTION OF EMBODIMENTS

A digital camera 100 (one example of an imaging device) pertaining to an embodiment of the present invention will now be described through reference to the drawings.

For the sake of convenience in this description, the subject side of the digital camera 100 will be defined as "the front" or "the front face side," the user side as "the rear" or "the rear face side," the vertical upper side in the landscape orientation of the digital camera 100 as "the upper side," the vertical lower side in the landscape orientation of the digital camera 100 as "the lower side," the right side as seen from the subject side as "the right side," and the left side as seen from the subject side as "the left side." The term "landscape orientation" refers to an orientation in which the long-side direction of a CMOS image sensor 110 is parallel to the horizontal direction, and the short-side direction of the CMOS image sensor 110 is parallel to the vertical direction.

Overall Configuration of Digital Camera 100

Figure 1:
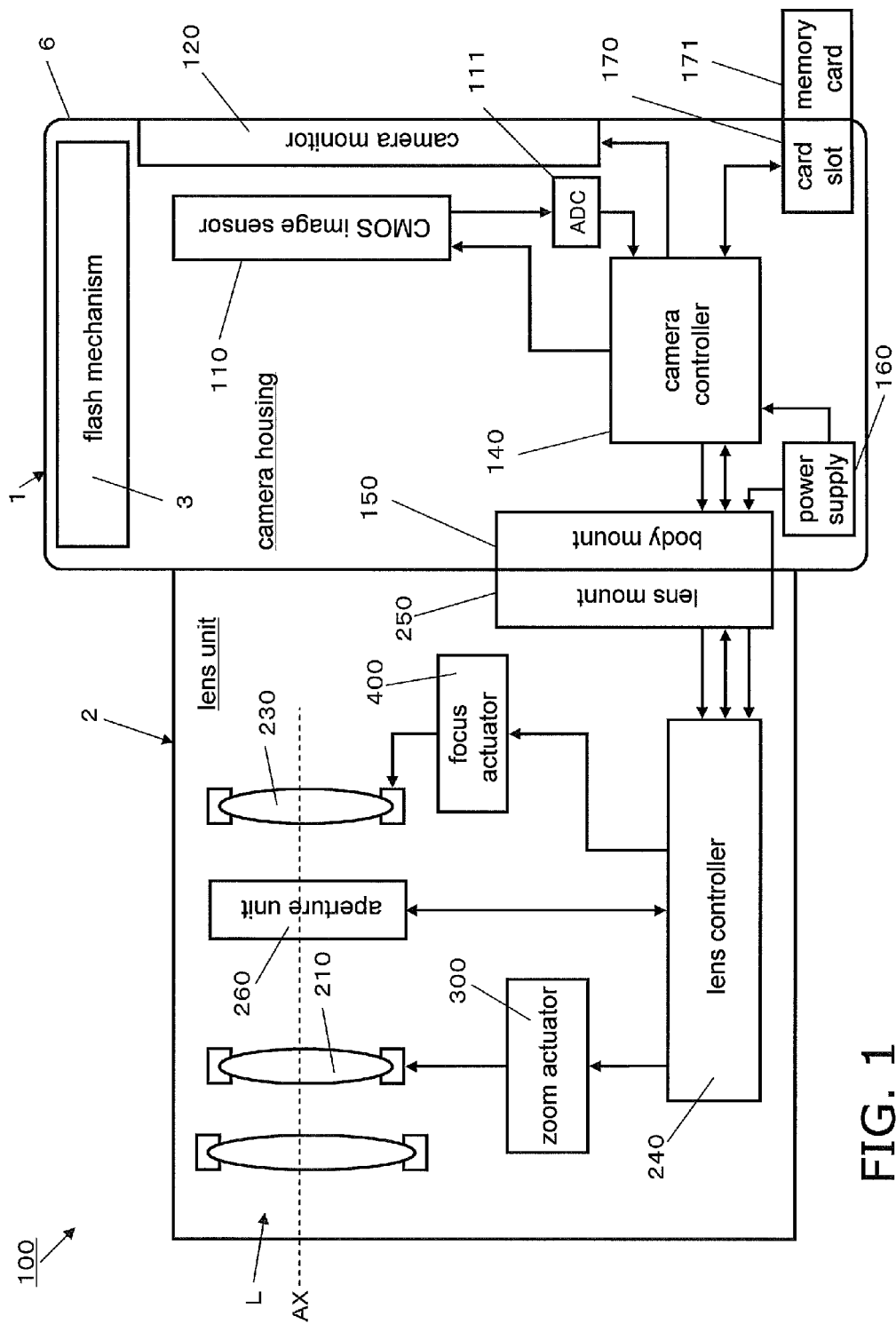
FIG. 1 is a block diagram of the functional configuration of a digital camera.
Figure 2:
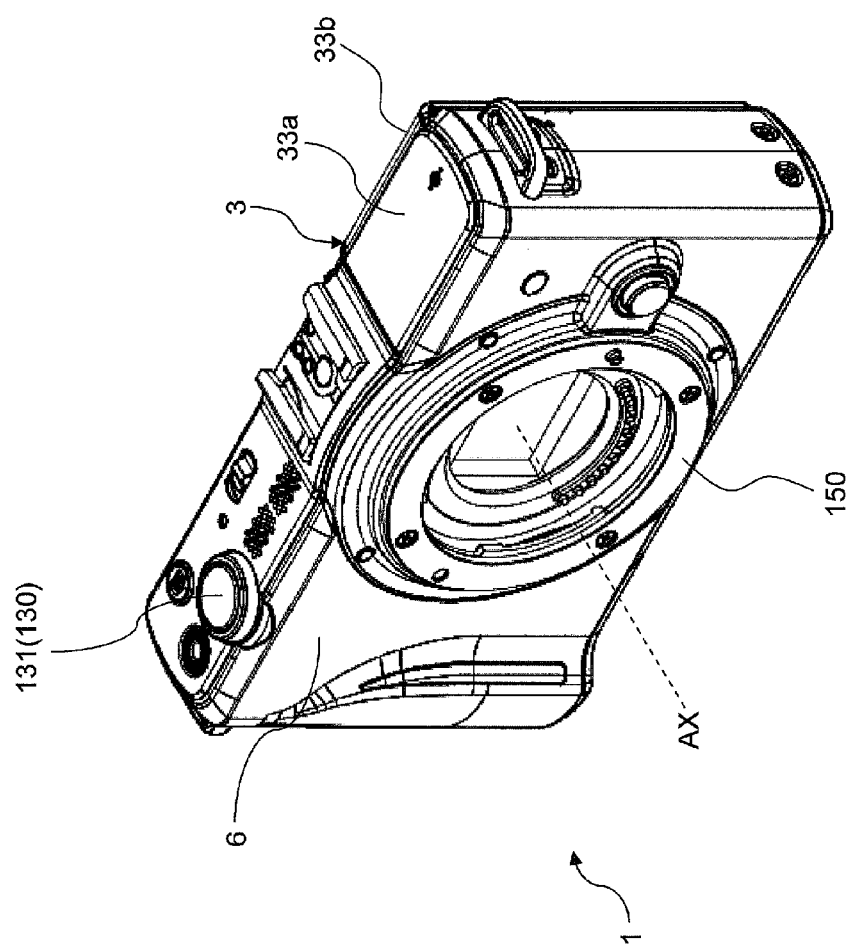
FIG. 2 is a top oblique view of a camera body, showing the unexposed state of a flash mechanism.
Figure 3:
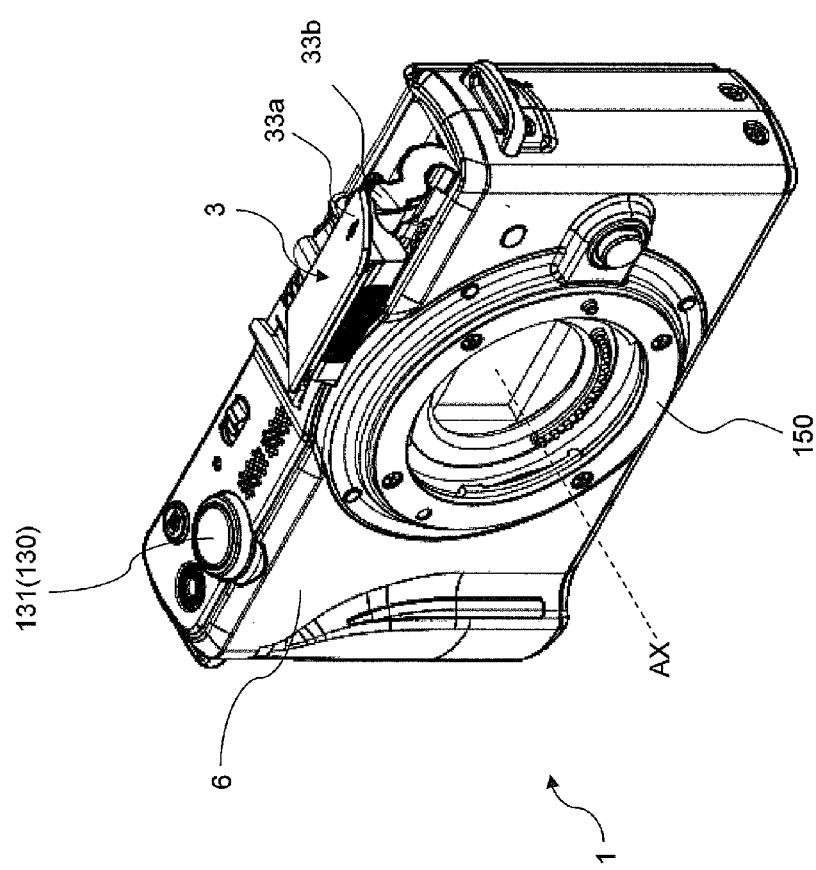
FIG. 3 is a top oblique view of a camera body, showing the exposed state of a flash mechanism.
Figure 4:
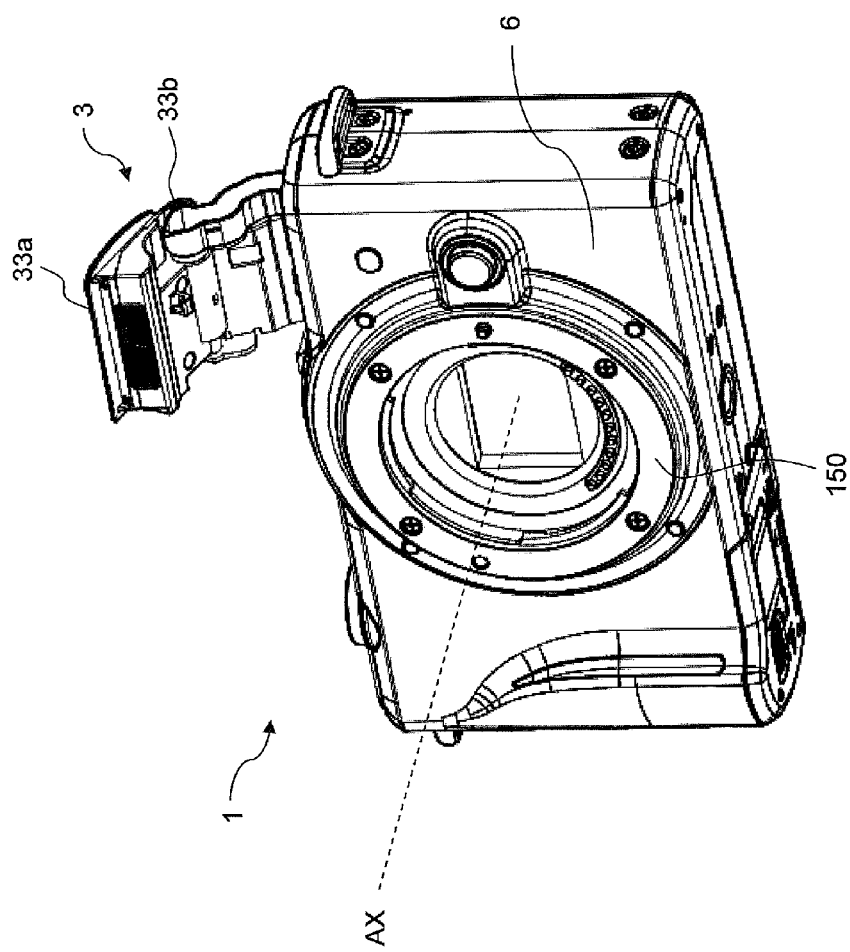
FIG. 4 is a bottom oblique view of a camera body, showing the exposed state of a flash mechanism.

The overall configuration of the digital camera 100 will be described through reference to FIGS. 1 to 4. FIG. 1 is a block diagram of the functional configuration of the digital camera 100. FIG. 2 is a top oblique view of a camera body 1, showing the unexposed state of a flash mechanism 3. FIG. 3 is a top oblique view of the camera body 1, showing the exposed state of the flash mechanism 3. FIG. 4 is a bottom oblique view of the camera body 1, showing the exposed state of the flash mechanism 3. A lens unit 2 is not shown in FIGS. 2 to 4.

As shown in FIG. 1, the digital camera 100 comprises the camera body 1 and the lens unit 2. The lens unit 2 is removably mounted to the camera body 1.

Camera Body 1

The camera body 1 comprises a flash mechanism 3, a camera housing 6 (one example of a camera housing), the CMOS image sensor 110An A/D converter 111A camera monitor 120, a manipulation component 130, a camera controller 140, a body mount 150, a power supply 160, and a card slot 170. As shown in FIG. 1, the CMOS image sensor 110, the A/D converter 111, the camera controller 140, the power supply 160, and the card slot 170 are provided inside the camera housing 6. As shown in FIGS. 1 to 3, the camera monitor 120, the manipulation component 130, and the body mount 150 are attached around the camera housing 6.

The flash mechanism 3 is stowed inside the camera housing 6 when not in use, and pops up from the camera housing 6 when it is to be used. Specifically, the flash mechanism 3 moves between the unexposed state shown in FIGS. 3 and 4 and the exposed state shown in FIG. 2. The unexposed state is a state in which at least part of the flash mechanism 3 is stowed inside a storage space S (not shown in FIGS. 1 to 4; however, see FIG. 7) provided inside the camera housing 6. The exposed state is a state in which the flash mechanism 3 has popped up from inside the storage space S.

As shown in FIG. 2, the camera housing 6 constitutes the main components of the outer shell of the digital camera 100 along with a first cover 33a and a second cover 33b included in the flash mechanism 3. The storage space S that accommodates the flash mechanism 3 is provided in the upper-right corner inside the camera housing 6.

The CMOS image sensor 110 is an imaging element that produces image data by capturing an optical image of a subject, formed by an optical system L having a lens unit 2. The image data produced by the CMOS image sensor 110 is digitized by the A/D converter 111. The image data digitized by the A/D converter 111 is subjected to various kinds of image processing by the camera controller 140. This image processing includes, for example, gamma correction processing, white balance correction processing, scratch correction processing, YC conversion processing, electronic zoom processing, and compression processing. The image data that has undergone this image processing by the camera controller 140 is recorded as a moving or still picture file to a memory card 171 via the card slot 170.

The camera monitor 120 is disposed on the rear face of the camera body 1. The camera monitor 120 can be, for example, an organic EL display, an inorganic EL display, a plasma display, or the like. The camera monitor 120 displays images based on image data and so forth recorded to the memory card 171, and through-images based on image data that has undergone image processing by the camera controller 140.

The manipulation component 130 is variously manipulated by the user. The manipulation component 130 includes a release button 131. The release button 131 receives input from the user for the timing at which to record moving and still pictures. The manipulation component 130 is an electrical button, and sends the camera controller 140 a signal indicating the details of the operation performed by the user. A flash pop-up button 41 (discussed below; see FIG. 7) is a non-electrical button constituted by mechanical elements. The manipulation component 130 can be in the form of a button, a lever, a dial, a touch panel, or another other form.

The camera controller 140 is a microprocessor that includes a CPU, a RAM, and a ROM. The camera controller 140 controls the operation of the various components of the camera body 1, such as the CMOS image sensor 110And the camera monitor 120, and thereby comprehensively controls the operation of the entire camera body 1. As shown in FIG. 1, the camera controller 140 can communicate with a lens controller 240 via the body mount 150 and a lens mount 250. The camera controller 140 comprehensively controls the operation of the entire digital camera 100 while working together with the lens controller 240 according to the user instructions inputted through the manipulation component 130.

The body mount 150 removably supports the lens unit 2. The body mount 150 is mechanically and electrically connected to the lens mount 250 of the lens unit 2.

The power supply 160 supplies electrical power to the various components of the digital camera 100. The power supply 160 may be a dry cell or a rechargeable cell, for example, or may supply power to the digital camera 100 from the outside via a power cord or the like.

The card slot 170 removably supports the memory card 171. The memory card 171 is a recording medium that holds image data and so forth.

Lens Unit 2

As shown in FIG. 1, the lens unit 2 comprises the lens mount 250, the optical system L, an aperture unit 260, a zoom actuator 300, a focus actuator 400, and the lens controller 240.

The lens mount 250 is removably mounted to the body mount 150 of the camera body 1.

The optical system L forms an optical image of a subject. The optical system L includes a zoom lens 210And a focus lens 230. FIGS. 1 to 4 show the optical axis AX of the optical system L. The aperture unit 260 adjusts the amount of light that passes through the optical system L.

The zoom lens 210 is able to move parallel to the optical axis AX so as to change the focal distance of the optical system L. The zoom lens 210 is driven by the zoom actuator 300.

The focus lens 230 is able to move parallel to the optical axis AX so as to change the focus state of the optical system L. The focus lens 230 is driven by the focus actuator 400.

The lens controller 240 is a microprocessor that includes a CPU, a RAM, and a ROM. The lens controller 240 comprehensively controls the operation of the entire lens unit 2 by controlling the operation of the various components of the lens unit 2 (including the zoom actuator 300 and the focus actuator 400).

Detailed Configuration of Flash Mechanism 3

Figure 5:
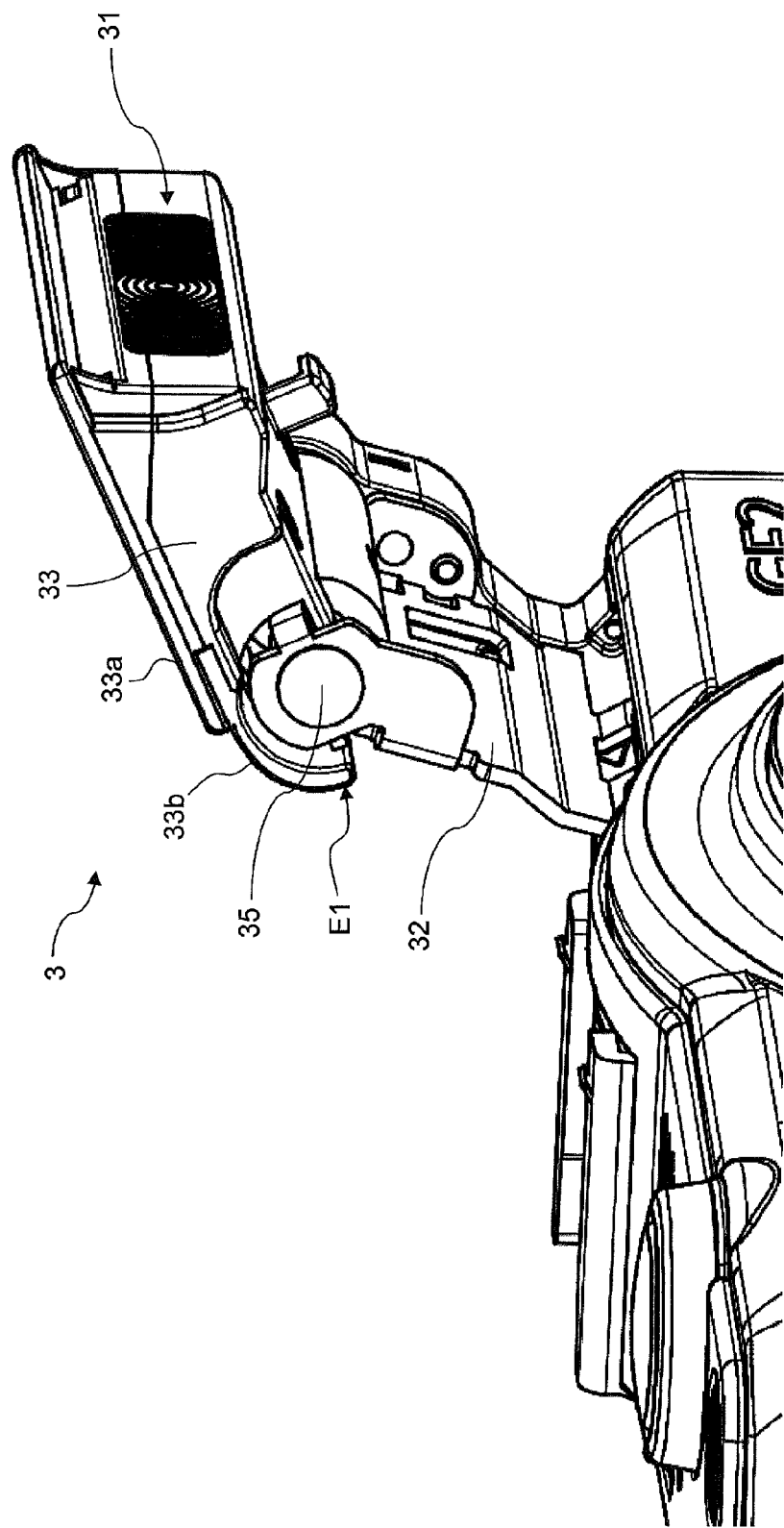
FIG. 5 is a front oblique view of a flash mechanism in an exposed state.
Figure 6:
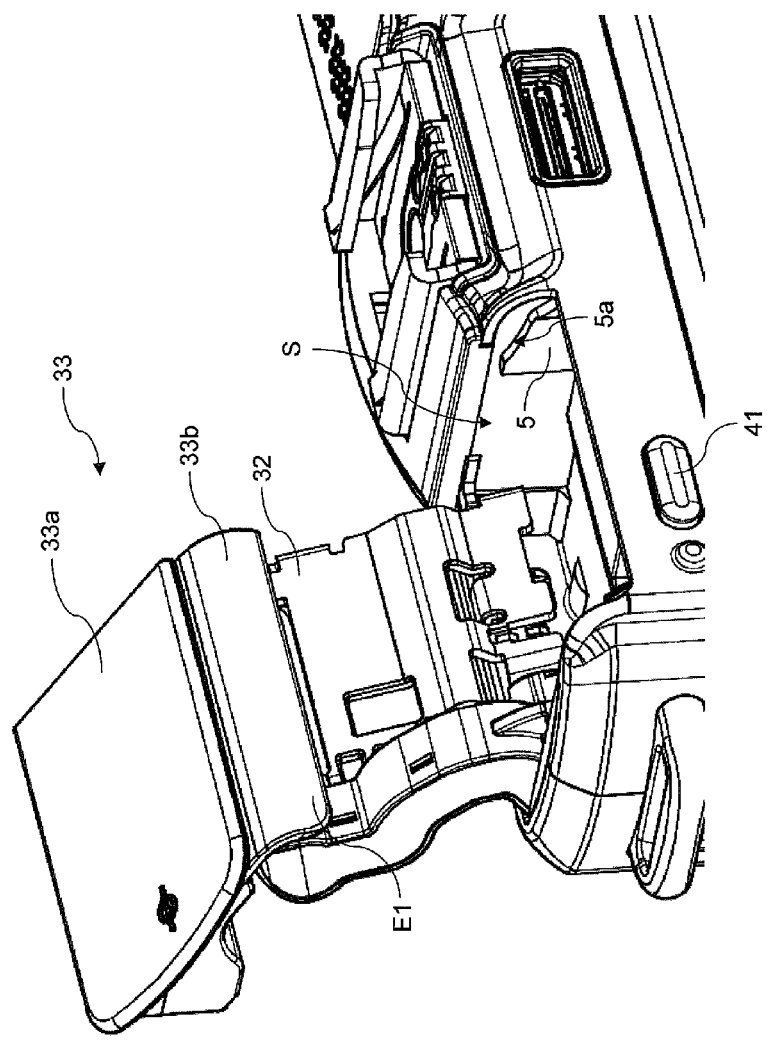
FIG. 6 is a rear oblique view of a flash mechanism in a exposed state.
Figure 7:
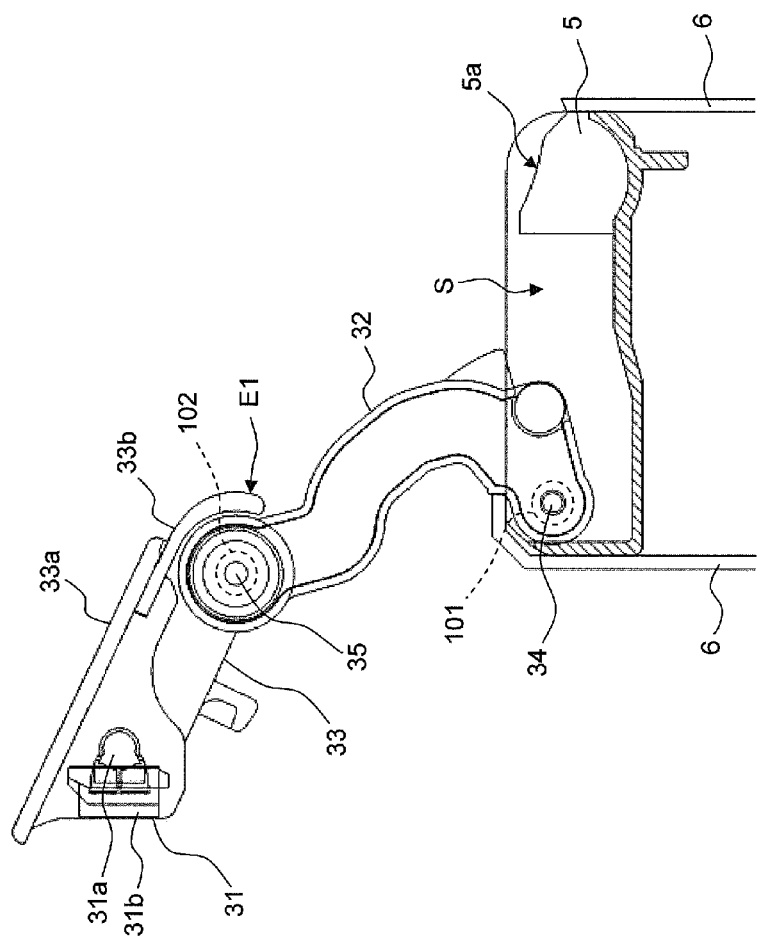
FIG. 7 is a side see-through view of a flash mechanism in a exposed state.
Figure 8:
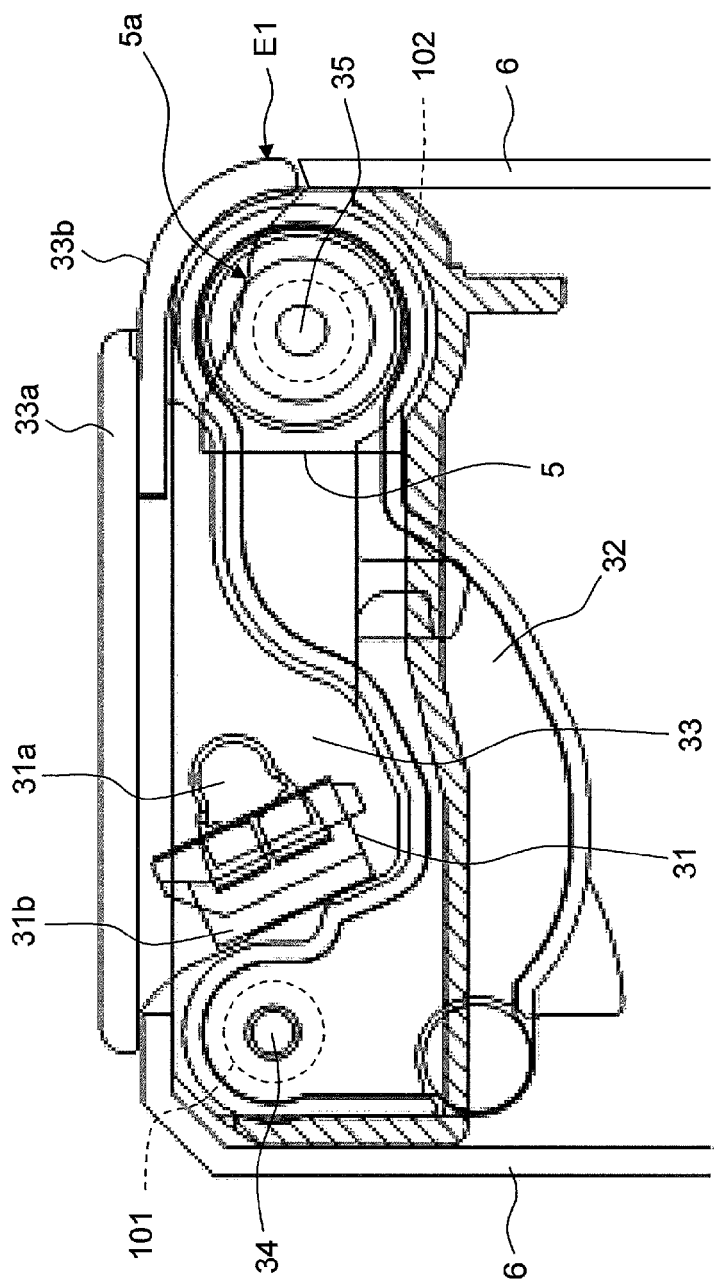
FIG. 8 is a side see-through view of a flash mechanism in a unexposed state.

The detailed configuration of the flash mechanism 3 will now be described through reference to FIGS. 5 to 9. FIG. 5 is a front oblique view of the flash mechanism 3 in its exposed state. FIG. 6 is a rear oblique view of the flash mechanism 3 in its exposed state. FIG. 7 is a side see-through view of the flash mechanism 3 in its exposed state. FIG. 8 is a side see-through view of the flash mechanism 3 in its unexposed state. The lens unit 2 is not depicted in FIGS. 5 to 8.

The flash mechanism 3 has a flash light emitter 31, a first arm member 32 (one example of a first arm), a second arm member 33 (one example of a second arm), a first rotating shaft 34, and a second rotating shaft 35.

As shown in FIGS. 7 and 8, the flash light emitter 31 has an emission source 31a and an irradiation window 31b. The emission source 31a receives the supply of electrical power from a capacitor (not shown), and emits light according to the timing of operation of a shutter unit (not shown). The timing at which the emission source 31a emits light is controlled by the camera controller 140.

The emission source 31a is surrounded by the irradiation window 31b, which transmits the flash of light emitted from the emission source 31a, and a blocking member (not shown) that blocks off the flash. Therefore, the flash emitted from the emission source 31a is emitted outside of the flash light emitter 31 only from the irradiation window 31b. The irradiation window 31b faces substantially straight ahead in the exposed state. Therefore, the flash of light travels substantially straight ahead in the exposed state.

The irradiation window 31b is fixed to the second arm member 33, and neither moves nor rotates with respect to the second arm member 33. Therefore, when the user wants to adjust the irradiation direction of the flash light, the position of the second arm member 33 is adjusted with respect to the camera housing 6. As will be discussed below, the position of the second arm member 33 with respect to the camera housing 6 is determined by the rotational angle of the first arm member 32 around the first rotating shaft 34, and the rotational angle of the second arm member 33 around the second rotating shaft 35. Therefore, the user can adjust the irradiation direction of the flash by rotating the first arm member 32 around the first rotating shaft 34, or by rotating the second arm member 33 around the second rotating shaft 35.

As shown in FIGS. 7 and 8, the first rotating shaft 34 is disposed in the front upper corner within the storage space S, so as to extend to the left and right. The first rotating shaft 34 is fixed to the camera housing 6. The first rotating shaft 34 is arranged along a central axis (an imaginary line; not shown), and the central axis of the first rotating shaft 34 is an example of a first rotating central axis. In this embodiment, "rotation around the first rotating shaft 34" means "rotation around the first rotating central axis."

The first arm member 32 is designed to be rotatable by a first angle around the first rotating shaft 34. This first angle is a specific angle that is greater than 90°. In other words, the first rotating shaft 34 rotates the first arm member 32 between a first rotational position and a second rotational position with respect to the camera housing 6. The first rotational position and the second rotational position are separated by the first angle around the first rotating shaft 34. The first rotational position and the second rotational position define the range of rotation of the first arm member 32 with respect to the camera housing 6. As shown in FIG. 7, the first arm member 32 is located at the first rotational position in the exposed state, and is located at the second rotational position in the unexposed state as shown in FIG. 8. In this embodiment, the first rotating shaft 34 is fixed to the camera housing 6, and the first arm member 32 is able to rotate around the first rotating shaft 34, but in another embodiment, the first rotating shaft 34 may be rotatable with respect to the camera housing 6, and the first arm member 32 fixed to the first rotating shaft 34.

As shown in FIG. 7 and FIG. 8, the first arm member 32 is biased by a first rotary biasing spring 101 (one example of a first biasing component; not shown) so as to pop up to the first rotational position. The first arm member 32 is stationary at the first rotational position as shown in FIGS. 5 to 7 if a locking mechanism (not shown) is unlocked in the unexposed state and no external force is applied by user operation or the like. The first rotary biasing spring 101 is a coil spring which is arranged around the first rotating shaft 34.

As shown in FIGS. 7 and 8, the second rotating shaft 35 is disposed extending to the left and right at the end of the first arm member 32 on the opposite side from the first rotating shaft 34. The second rotating shaft 35 is fixed to the first arm member 32. The second rotating shaft 35 is arranged along a central axis (an imaginary line; not shown), and the central axis of the second rotating shaft 35 is an example of a second rotating central axis. In this embodiment, "rotation around the second rotating shaft 35" means "rotation around the second rotating central axis."

The second arm member 33 is designed to be rotatable by a second angle around the second rotating shaft 35. This second angle is a specific angle that is greater than 90°. In other words, the second rotating shaft 35 rotates the second arm member 33 between a third rotational position and a fourth rotational position with respect to the first arm member 32. The third rotational position and the fourth rotational position are separated by the second angle around the second rotating shaft 35. The third rotational position and the fourth rotational position define the range of rotation of the second arm member 33 with respect to the first arm member 32. As shown in FIG. 7, the second arm member 33 is located at the third rotational position in the exposed state, and is located at the fourth rotational position in the unexposed state as shown in FIG. 8. In this embodiment, the second rotating shaft 35 is fixed to the first arm member 32, and the second arm member 33 is able to rotate around the second rotating shaft 35, but in another embodiment, the second rotating shaft 35 may be rotatable with respect to the first arm member 32, and the second arm member 33 fixed to the second rotating shaft 35.

The rotation of the first arm member 32 around the first rotating shaft 34 with respect to the camera housing 6 is independent from the rotation of the second arm member 33 around the second rotating shaft 35 with respect to the first arm member 32. In other words, with the flash mechanism 3, there is no mechanism or the like for linking the rotation of the first arm member 32 with the rotation of the second arm member 33.

As shown in FIG. 7 and FIG. 8, the second arm member 33 is biased by a second rotary biasing spring 102 (one example of a second biasing component; not shown) so as to pop up to the third rotational position. The second arm member 33 is stationary at the third rotational position if a locking mechanism (not shown) is unlocked in the unexposed state and no external force is applied by user operation or the like. The second rotary biasing spring 102 is a coil spring which is arranged around the second rotating shaft 35.

The flash light emitter 31 is attached (fixed) to the end of the second arm member 33 on the opposite side from the second rotating shaft 35.

The second arm member 33 has the first cover 33a and the second cover 33b (one example of a second rotation restricting member). As shown in FIG. 8, the first cover 33a and the second cover 33b are members that block off the storage space S so that the storage space S is closed off from the outside. The first cover 33a and the second cover 33b constitute part of the outer shell of the digital camera 100 along with the camera housing 6 in a unexposed state (see FIGS. 2 and 3).

The second cover 33b is linked to the rear end of the first cover 33a. The second cover 33b extends in a downward and backward curve from the rear end of the first cover 33a. The second cover 33b has a substantially circular arc shape in side view.

As shown in FIGS. 6 to 8, the camera body 1 comprises a cam component 5 (one example of a first rotation restricting member) disposed inside the storage space S.

As shown in FIG. 6, the cam component 5 is disposed in the left-rear corner of the storage space S. The cam component 5 has a contact face 5a that extends to the rear. The contact face 5a curves gently downward.

As shown in FIG. 9, the cam component 5 hits the end E1 of the second cover 33b in the course of the movement of the flash mechanism 3 from its exposed state to its unexposed state, and this temporarily restricts the rotation of the first arm member 32 toward the second rotational position. This prevents the first arm member 32 from moving to the second rotational position when the second arm member 33 is positioned in the third rotational position. Furthermore, if the second arm member 33 rotates toward the fourth rotational position from the third rotational position, the first arm member 32 is prevented from moving to the second rotational position when the second arm member 33 is more than 90° away from the fourth rotational position. FIG. 9 is an oblique view of a state in which the end E1 of the second cover 33b has hit the cam component 5. As the second arm member 33 rotates from this state around the second rotating shaft 35 and toward the fourth rotational position, the end E1 of the second cover 33b is able to move downward along the contact face 5a. The operation of the flash mechanism 3 will be discussed below.

Operation of Flash Mechanism 3

(1) Operation During Exposed State

The operation of the flash mechanism 3 as it moves from its unexposed state to its exposed state will be described through reference to FIGS. 10A and 10B.

As shown in FIG. 10A, in the unexposed state, the first arm member 32 is stationary at the second rotational position, and the second arm member 33 is stationary at the fourth rotational position. Accordingly, in the unexposed state, the first arm member 32 and the second arm member 33 are lowered down substantially in the fore and aft direction (the optical axis AX direction), and the flash light emitter 31, the first rotating shaft 34, and the second rotating shaft 35 are aligned substantially on the same line in the fore and aft direction (the optical axis AX direction).

When the flash pop-up button 41 (not shown in FIGS. 10A and 10B; see FIG. 9) is pressed forward in the unexposed state of the flash mechanism 3, a locking mechanism (not shown) is unlocked. In response, a biasing force is applied by two rotary biasing springs (not shown) to rotate the first arm member 32 around the first rotating shaft 34 from the second rotational position to the first rotational position, and to rotate the second arm member 33 around the second rotating shaft 35 from the fourth rotational position to the third rotational position, respectively. Thus, the flash mechanism 3 moves immediately from its unexposed state to its exposed state when the flash pop-up button 41 is pressed.

As shown in FIG. 10B, in the exposed state, the first arm member 32 is stationary at the first rotational position, and the second arm member 33 is stationary at the third rotational position. In the exposed state, the first arm member 32 and the second arm member 33 are each biased forward diagonally. Also, in the exposed state, the second rotating shaft 35 is located ahead of the first rotating shaft 34. As a result, the flash light emitter 31 sticks out on the subject side, and flash light emitted from the flash light emitter 31 is less likely to be blocked by the lens unit 2. Also, in the exposed state, the irradiation window 31b faces substantially straight ahead. Therefore, in the exposed state the flash light is emitted substantially straight ahead.

Also, in the exposed state, the two rotary biasing springs (not shown) bias the first arm member 32 and the second arm member 33, respectively, so as to maintain the exposed state. However, the user can manually change the rotational angle of the first arm member 32 and/or the second arm member 33 against the biasing force of the two rotary biasing springs. When the rotational angle of the first arm member 32 and/or the second arm member 33 changes, the orientation of the irradiation window 31b, that is, the direction in which the flash light is emitted, changes. Also, as discussed above, the rotation of the first arm member 32 around the first rotating shaft 34 is independent from the rotation of the second arm member 33 around the second rotating shaft 35. Therefore, the user can freely adjust the direction in which the flash light is emitted by independently adjusting the rotational angle of the first arm member 32 and the rotational angle of the second arm member 33. This allows the user to perform bounce flash photography.

(2) Operation During Storage

The operation when the flash mechanism 3 moves from its exposed state to its unexposed state will be described through reference to FIGS. 11A to 11D.

If the user does not wish to put the flash mechanism 3 back in the storage space S, the first arm member 32 is manually rotated around the first rotating shaft 34 from the first rotational position to the second rotational position, and the second arm member 33 is rotated around the second rotating shaft 35 from the third rotational position to the fourth rotational position.

Here, the rotation of the first arm member 32 around the first rotating shaft 34 is independent from the rotation of the second arm member 33 around the second rotating shaft 35. Therefore, even if there were no cam component 5 or second cover 33b, a state could still be achieved in which the second arm member 33 is located at the third rotational position and the first arm member 32 is located at the second rotational position. In this state, since the orientation of the irradiation window 31b is tilted more to the rear than the vertically upward direction, there is the risk that the flash light will be emitted at the user.

In this embodiment, however, the rotation of the first arm member 32 to the second rotational position is temporarily restricted when the second arm member 33 is located in the third rotational position.

Figure 11B:
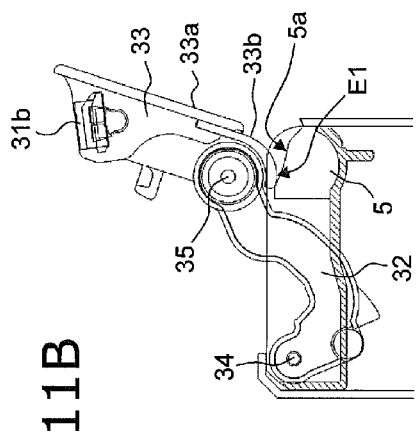
FIG. 11B is a side see-through view illustrating the operation of a flash mechanism.
Figure 11D:
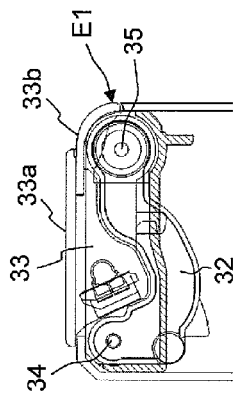
FIG. 11D is a side see-through view illustrating the operation of a flash mechanism.
Figure 11A:
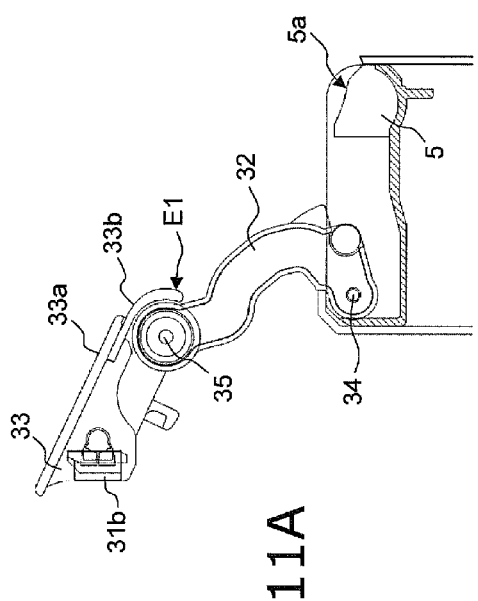
FIG. 11A is a side see-through view illustrating the operation of a flash mechanism.

More specifically, when the first arm member 32 is rotated from the first rotational position shown in FIG. 11A to the position shown in FIG. 11B, the end E1 of the second cover 33b hits the cam component 5, and this prevents the first arm member 32 from rotating any further toward the second rotational position. In this state, the irradiation window 31b is tilted slightly forward past the vertically upward direction, so it is less likely that the flash light will be emitted at the user.

Figure 11C:
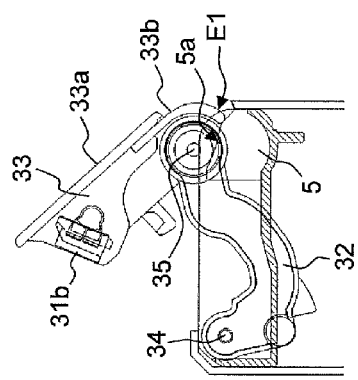
FIG. 11C is a side see-through view illustrating the operation of a flash mechanism.

Then, as shown in FIG. 11C, when the user applies forward force to the second arm member 33, the end E1 of the second cover 33b is guided along the contact face 5a of the cam component 5, from the front end of the contact face 5a downward and to the rear. As a result, as the second arm member 33 rotates around the second rotating shaft 35 toward the fourth rotational position, the first arm member 32 rotates around the first rotating shaft 34 toward the second rotational position.

After this, as shown in FIG. 11D, when the user applies force so as to press on the second arm member 33, the first arm member 32 and the second arm member 33 are locked in a folded up state. Consequently, the first arm member 32 is kept in the second rotational position and the second arm member 33 is kept in the fourth rotational position, and this completes the storage of the flash mechanism 3.

(3) Other Operation During Storage

Next, other operation when the flash mechanism 3 moves from its exposed state to its unexposed state will be described through reference to FIGS. 12A to 12D. What is different from the operation during storage as discussed above is that the second arm member 33 is rotated forward at the point when the end E1 of the second cover 33b hits the cam component 5 (see FIGS. 11B and 12B).

Figure 12B:
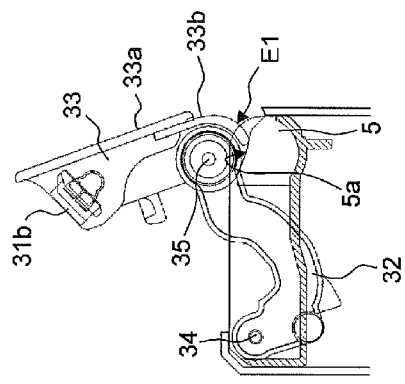
FIG. 12B is a side see-through view illustrating other operation of a flash mechanism.
Figure 12D:
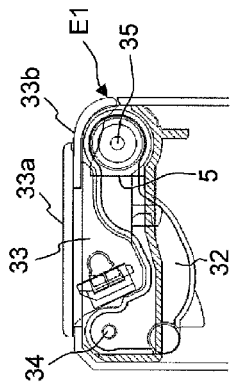
FIG. 12D is a side see-through view illustrating other operation of a flash mechanism.
Figure 12A:
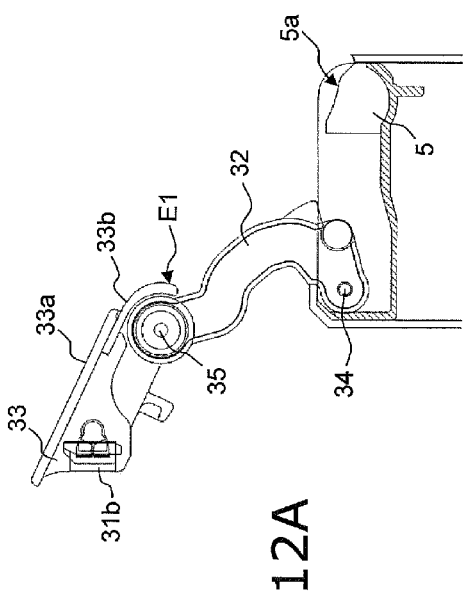
FIG. 12A is a side see-through view illustrating other operation of a flash mechanism.
Figure 12C:
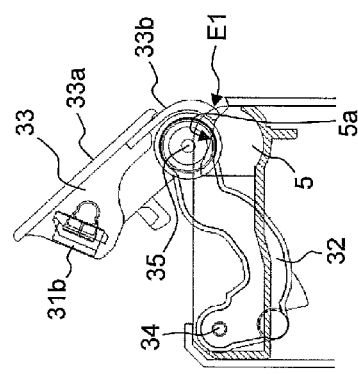
FIG. 12C is a side see-through view illustrating other operation of a flash mechanism.

First, the second arm member 33 is tilted forward at the point when the first arm member 32 has rotated from the first rotational position in FIG. 12A to the position indicated in FIG. 12B. Although the second arm member 33 rotates toward the fourth rotational position from the third rotational position, the second arm member 33 is more than 90° away from the fourth rotational position. As shown in FIG. 12B, the end E1 of the second cover 33b here is located farther to the rear than the position shown in FIG. 11B, so the end E1 of the second cover 33b hits in a region of the contact face 5a farther to the rear than the front end.

Here, if the contact face 5a of the cam component 5 is not extended (that is, if the cam component 5 is smaller), there is the risk that the end E1 of the second cover 33b will not hit the cam component 5. If the end E1 of the second cover 33b does not hit the cam component 5, the rotation of the first arm member 32 will not be restricted, so the first arm member 32 will end up rotating nonstop all the way to the second rotational position. As a result, there is the risk that the flash light will shine on the user.

With this embodiment, however, since the contact face 5a of the cam component 5 is extended, even when the second arm member 33 is tilted forward, the end E1 of the second cover 33b will still hit the contact face 5a. Accordingly, the end E1 of the second cover 33b is prevented from moving away from the cam component 5, so it is less likely that the flash light will shine on the user.

Other Embodiments

The digital camera 100 pertaining to an embodiment was described above, but the present invention is not limited to or by this example, and various modifications are possible without departing from the gist of the invention.

(A)

In the above embodiment, the storage space S was provided at the upper-right inside the camera housing 6, but may instead be disposed at some other place.

(B)

In the above embodiment, the first arm member 32 and the second arm member 33 were disposed at the rotation end in the exposed state. However, the first arm member 32 and/or the second arm member 33 need not be at the rotation end in the exposed state. For example, the first arm member 32 may also be manually rotatable forward from the exposed state. Similarly, the second arm member 33 may also be manually rotatable forward from the exposed state. In this case, the second rotational position in the exposed state need not protrude forward past the first rotational position. The second rotational position may be made to protrude forward past the first rotational position by manually rotating the first arm member 32 and/or the second arm member 33 from this exposed state.

(C)

In the above embodiment, the first arm member 32 and the second arm member 33 were each located at the rotation end in the unexposed state. However, the first arm member 32 and/or the second arm member 33 need not be at the rotation end in the unexposed state. For example, the second arm member 33 may reach the fourth rotational position in a non-unexposed state, and may be located at a specific rotation position between the third rotational position and the fourth rotational position in the unexposed state.

(D)

The flash light emitter 31 may be movable and/or rotatable with respect to the second arm member 33. It is preferable, however, for the flash light emitter 31 to be disposed so that the irradiation window 31b faces forward in the exposed state.

(E)

In the above embodiment, a CMOS image sensor was described as an example of an imaging element, but the present invention is not limited to this, and a CCD image sensor, for example, can be used as the imaging element.

(F)

In the above embodiment, the contact face 5a of the cam component 5 extended rearward while curving gently downward, but the present invention is not limited to this. The contact face 5a need not curve, and may instead extend straight to the rear.

(G)

In the above embodiment, the first arm member 32 and the second arm member 33 were biased by rotary biasing springs so as to pop out to the exposed position, but may instead be driven by an electric motor or other such electric apparatus.

General Interpretation of Terms

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" and "element" when used in the singular can have the dual meaning of a single part or a plurality of parts.

The term "configured" as used herein to describe a component, section, or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the number, size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
an optical system having an optical axis and configured to form an optical image of a subject;
a camera housing defining an opening that has an interior storage space; and
a flash mechanism connected to the camera housing and movable between an exposed state and an unexposed state, in the exposed state the flash mechanism extends outwardly from the interior space, and in the unexposed state the flash mechanism being positioned within the interior space,
the flash mechanism having a first arm and a second arm,
the first arm being located at a first rotational position in the exposed state and configured to rotate around a first axis located within the interior space, in the unexposed state the first arm being located at a second rotational position with the second rotational position being more than 90° away from the first rotational position,
the second arm being located at a third rotational position in the exposed state and configured to rotate with respect to the first arm around a second axis located closer to the subject than the first axis in the exposed state, in the unexposed state the second arm being located at a fourth rotational position with the fourth rotational position being different from the third rotational position; and
a light emitting component attached to the second arm.

2. The imaging device according to claim 1, wherein the first arm is prevented from moving to the second rotational position when the second arm is located at the third rotational position.

3. The imaging device according to claim 1, further comprising
a first rotation restricting member disposed in the interior space, wherein
the second arm has a second rotation restricting member that comes into contact with the first rotation restricting member when the first arm is located between the first rotational position and the second rotational position.

4. The imaging device according to claim 3, wherein
the first rotation restricting member has a contact surface that comes into contact with the second rotation restricting member, and
the contact surface extends in the direction of the optical axis of the optical system.

5. The imaging device according to claim 1, wherein
the fourth rotational position is more than 90° away from the third rotational position, and
the first arm is prevented from moving to the second rotational position when the second arm is more than 90° away from the fourth rotational position.

6. The imaging device according to claim 1, wherein
the flash mechanism has a first biasing component and a second biasing component, the first biasing component urges the first arm from the second rotational position to the first rotational position, and the second biasing component urges the second arm from the fourth rotational position to the third rotational position.

* * * * *